US006693532B2

(12) United States Patent
Capowski et al.

(10) Patent No.: US 6,693,532 B2
(45) **Date of Patent: *Feb. 17, 2004**

(54) ALARM SYSTEM HAVING IMPROVED COMMUNICATION

(75) Inventors: Anthony J. Capowski, Westford, MA (US); Michael A. Furtado, Shrewsbury, MA (US); Paul H. Maier, Jr., Athol, MA (US)

(73) Assignee: ADT Services AG, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/156,891

(22) Filed: May 28, 2002

(65) Prior Publication Data

US 2003/0080865 A1 May 1, 2003

Related U.S. Application Data

(63) Continuation of application No. 09/438,560, filed on Nov. 10, 1999, now Pat. No. 6,426,697.

(51) Int. Cl.$^{7}$ .......................... G08B 29/00; G05B 23/02

(52) U.S. Cl. ........................ 340/506; 340/505; 340/3.2; 340/3.52; 340/3.1

(58) Field of Search ................................ 340/506, 505, 340/508, 514, 693.3, 3.1, 3.2, 3.5, 3.51, 3.21, 10.1, 3.52, 10.34, 10.32, 10.33, 7.32, 7.37, 309.15, 825.2, 825.21

(56) References Cited

U.S. PATENT DOCUMENTS

| | | | | |
|---|---|---|---|---|
| 4,419,665 A | * | 12/1983 | Gurr et al. | 340/310.01 |
| 4,755,792 A | | 7/1988 | Pezzolo et al. | 340/538 |
| 4,796,025 A | | 1/1989 | Farley et al. | 340/825.08 |
| 5,400,009 A | | 3/1995 | Kosich et al. | 340/331 |
| 5,559,492 A | | 9/1996 | Stewart et al. | 340/331 |
| 5,598,139 A | | 1/1997 | Karim et al. | 340/286.11 |
| 5,608,375 A | | 3/1997 | Kosich | 340/293 |
| 5,751,210 A | | 5/1998 | Kosich | 340/293 |
| 6,426,697 B1 | * | 7/2002 | Capowski et al. | 340/506 |

* cited by examiner

*Primary Examiner*—Donnie L. Crosland
(74) *Attorney, Agent, or Firm*—Hamilton, Brook, Smith & Reynolds, P.C.

(57) ABSTRACT

An alarm system is provided which includes multiple notification appliances for signaling an alarm condition. The system controller intelligently controls the notification appliances including notification devices such as an audible or visual alarm through multi-bit digital messages sent over communication lines. The alarm system has both a standby and active mode of operation in which communication between the controller and notification appliances is possible in both modes of operation. In the standby mode, the notification appliances are powered at a first voltage level. Communication between the notification appliances and the system controller is provided by sending data pulses along the communication lines relative to the first voltage level.

5 Claims, 8 Drawing Sheets

| Bit 7 | 6 | 5 | 4 | 3 | 2 | 1 | 0 |
|---|---|---|---|---|---|---|---|
| Notification Appliance Configured | Notification Appliance Busy | Manual Input Detected | LED Status | 0 | Primary Output1 | 0 | 0 |

FIG. 8A

| Bit 7 | 6 | 5 | 4 | 3 | 2 | 1 | 0 |
|---|---|---|---|---|---|---|---|
| Notification Appliance Configured | Notification Appliance Busy | Manual Input Detected | LED Status | 0 | Primary Output1 | Primary Output2 | 0 |

FIG. 8B

| Bit 7 | 6 | 5 | 4 | 3 | 2 | 1 | 0 |
|---|---|---|---|---|---|---|---|
| Notification Appliance Configured | Notification Appliance Busy | Manual Input Detected | LED Status | 0 | Primary Output1 | 0 | 0 |

FIG. 8C

| Bit 7 | 6 | 5 | 4 | 3 | 2 | 1 | 0 |
|---|---|---|---|---|---|---|---|
| Isolator Configured | Isolator Busy | Powered Port# | LED Status | 0 | Contacts | OP.1 | OP.0 |

FIG. 8D

| Bit 7 | 6 | 5 | 4 | 3 | 2 | 1 | 0 |
|---|---|---|---|---|---|---|---|
| Strobe Mode | 0 | Diagnostics Enable | LED Mode | 0 | 0 | 0 | 0 |

FIG. 9A

| Bit 7 | 6 | 5 | 4 | 3 | 2 | 1 | 0 |
|---|---|---|---|---|---|---|---|
| Strobe Mode | 0 | Diagnostics Enable | LED Mode | Audible Output Level | Audible Coding Type2 | Audible Coding Type1 | Audible Coding Type0 |

FIG. 9B

| Bit 7 | 6 | 5 | 4 | 3 | 2 | 1 | 0 |
|---|---|---|---|---|---|---|---|
| 0 | 0 | Diagnostics Enable | LED Mode | Audible Output Level | Audible Coding Type2 | Audible Coding Type1 | Audible Coding Type0 |

FIG. 9C

| Bit 7 | 6 | 5 | 4 | 3 | 2 | 1 | 0 |
|---|---|---|---|---|---|---|---|
| 0 | 0 | 0 | LED Mode | 0 | 0 | 0 | 0 |

FIG. 9D

ALARM SYSTEM HAVING IMPROVED COMMUNICATION

RELATED APPLICATION

This application is a continuation of U.S. application Ser. No. 09/438,560, filed on Nov. 10, 1999 (now U.S. Pat. No. 6,426,697), the entire teachings of which are incorporated herein by reference.

BACKGROUND OF THE INVENTION

Typical building fire alarm systems include a number of fire detectors positioned throughout a building. Signals from those detectors are monitored by a system controller, which, upon sensing an alarm condition, sounds audible alarms throughout the building. Flashing light strobes may also be positioned throughout the building to provide a visual alarm indication. A number of notification appliances comprising audible alarms and strobes, the audible alarms and strobes being generally referred to as notification devices, are typically connected across common power lines on a notification circuit.

A first polarity DC voltage may be applied across the notification circuit in a supervisory mode of operation. In this supervisory mode, rectifiers at the notification appliances are reverse biased so that the alarms are not energized, but current flows through the power lines at the notification circuit to an end-of-line resistor and back, allowing the condition of those lines to be monitored. Because notification circuits are supervised using an end-of-line resistor, the wires of the circuit must be a single continuous run with no branches and an end-of-line resistor across the wires at the end farthest from the system controller. With an alarm condition, the polarity of the voltage applied across the power lines is reversed to energize all notification appliances on the notification circuit.

U.S. Pat. No. 5,559,492 issued to Stewart et al. (hereinafter the '492 Stewart patent) operates according to the system described above. The '492 Stewart patent further discloses that the visual alarms, or strobes, may be synchronized to fire simultaneously resulting from power interruptions, also referred to as synchronization pulses, in the power lines. Additional timing lines for synchronizing the strobes are not required because the synchronizing signals are applied through the existing common power lines.

Other alarm systems have controlled the function of the audible and visual alarms by interrupting the power signal to the alarms in a predetermined pattern as control signals over the common power lines or by communicating during the synchronization interruption of power. The audible and visual alarms operate their respective loads responsive to the control signal received.

SUMMARY OF THE INVENTION

Prior art systems have not provided for control signals to be issued from the system controller to the notification appliances during the term of the supervisory mode. As such, prior art systems do not provide for communication between the notification appliances and the system controller during supervisory mode other than passive communication, such as monitoring the common power lines for a short circuit or other fault.

The invention disclosed below provides detailed communication between the system controller and notification appliances during a supervisory or standby mode of operation. This is accomplished by providing notification appliances which are powered during the standby mode by a pair of communication lines at a first voltage level by a system controller. Communication between the notification appliances and the system controller is provided by sending data pulses along the power lines relative to the first voltage level. In an active mode of operation, the first voltage level is raised to a second voltage level providing the power so that the appliances can be commanded on. Communication in the active mode is accomplished by reducing the second voltage level to about the first voltage level and sending data pulses along the power lines relative to the first voltage level.

The communications between the controller and the appliances during the supervisory mode allows the notification circuit including the devices to be supervised. Branching of the circuit is allowed because communication is used to supervise the circuit. Any breaks in the notification circuit wires will inhibit communications to one of the devices and can be quickly identified by the system controller.

Preferably, the data pulses form a digital message that comprises a first synchronization signal, a command field, a data field, and a second synchronization signal. Each notification appliance includes an electronic circuit that receives the digital message and responds to the digital message as directed by the command field.

According to one aspect of the invention, the system controller can synchronize respective timers at each notification appliance on a notification appliance circuit with a digital message comprising a Synchronization Poll. The timer of each notification appliance is used to control timed operation in the notification appliance, such as actuation of an audible and/or visual alarm. An electronic circuit at each notification appliance decodes a multi-bit time descriptor of the Synchronization Poll and resets the timer of the notification appliance to the time of the time descriptor. The Synchronization Poll includes a first synchronization signal, a command signal identifying the synchronization poll as the synchronization poll, the multi-bit time descriptor, and a second synchronization signal.

It is desirable to organize the notification appliances including notification devices into groups such that the system controller can efficiently operate the same. Accordingly, the system controller can apply application specific group numbers to a first notification device of a particular notification appliance via a digital message comprising a Notification Appliance First Notification Device Group Assignment Command. Each notification appliance includes an electronic circuit that decodes a multi-bit command identifying the digital message as a Notification First Notification Device Group Assignment Command. The circuit decodes an address field of the digital message assigning the first notification device a first particular group number. More than one group number may be assigned to the first notification device.

The system controller can apply application specific group numbers to a second particular notification device of notification appliances having at least two notification devices via a digital message comprising a Notification Appliance Second Notification Device Group Assignment Command. Each notification appliance includes an electronic circuit that decodes a multi-bit command identifying the digital message as a Notification Second Notification Device Group Assignment Command. The circuit decodes an address field of the digital message assigning the first notification device a first particular group number. More than one group number may be assigned to the second notification device.

According to a further aspect of the present invention, the system controller can solicit general status information from a cluster or set of notification appliances via a digital message comprising a Cluster Service Poll. Each notification appliance includes an electronic circuit that decodes a multi-bit command identifying the digital message as a Cluster Service Poll and a cluster set address field which addresses a cluster of notification appliances, for example, a set of eight notification appliances. The individual notification appliances of a cluster respond to the Cluster Service Poll at a designated response time which may follow a single synchronization pulse or, alternatively, each notification appliance may follow a respective synchronization response signal. The notification appliance responds with a message indicating the status of the notification appliance.

According to other aspects, an alarm system is provided which includes a plurality of notification appliances, a system controller that communicates with the notification appliances in a standby mode of operation, and a notification circuit that powers the notification appliances and carries the communications between the system controller and the notification appliances. The notification appliances include an electronic circuit to respond to the system controller with indications of appliance state. The system controller uses the communications to supervise the notification appliances.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 8A–8D illustrate the significance of each bit in a status field with respect to a particular notification appliance.

FIGS. 9A–9D illustrate the significance of each bit within a configuration field with respect to a particular notification appliance.

DETAILED DESCRIPTION OF THE INVENTION

Figure 1:
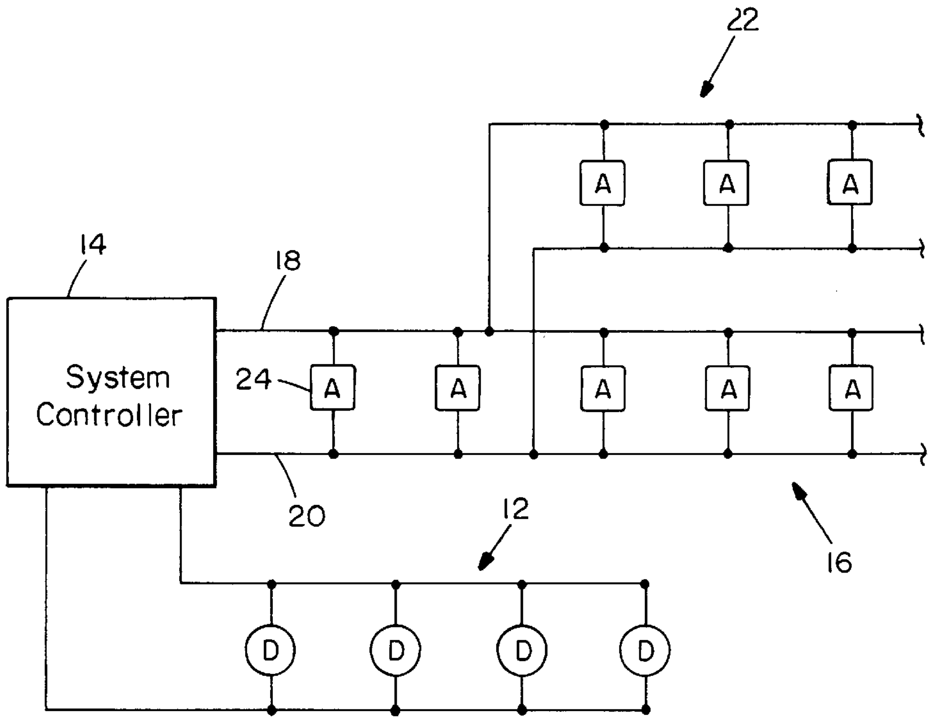
FIG. 1 illustrates an alarm system embodying a first preferred embodiment of the present invention.

A system embodying the present invention is illustrated in FIG. 1. As in a conventional alarm system, the system includes one or more detector networks 12 having individual alarm condition detectors D which are monitored by a system controller 14. When an alarm condition is sensed, the system controller 14 signals the alarm to the appropriate devices through at least one network 16 of addressable alarm notification appliances A. Each device, also called a notification appliance 24, may include one or more notification devices, for example, a visual alarm (strobe), an audible alarm (horn), or a combination thereof (A/V device). Also, a speaker for broadcasting live or prerecorded voice messages and a strobe may be combined into a single unit (SN device). A visible indicator (LED) may be provided on any of the above-described notification appliances 24, the LED also controlled by the system controller 14. For example, the LED may be operated under NAC commands (described below) such that the LED blinks every time the notification appliance 24 is polled.

Because the individual notification appliances 24 are addressable, supervision occurs by polling each device, as will be discussed in detail below, so that a network 16, also referred to as a notification appliance circuit (NAC), can include one or more single-ended stub circuits 22. The use of stub circuits 22, also referred to as ‘T-tapping’, provides a number of immediate advantages, including lessening the effect of IR losses, reducing the wire material and installation costs, and allowing for increased NAC wiring distances. As shown, all of the notification appliances are coupled across a pair of power lines 18 and 20 that advantageously also carry communications between the system controller 14 and the notification appliances 24.

Figure 2:
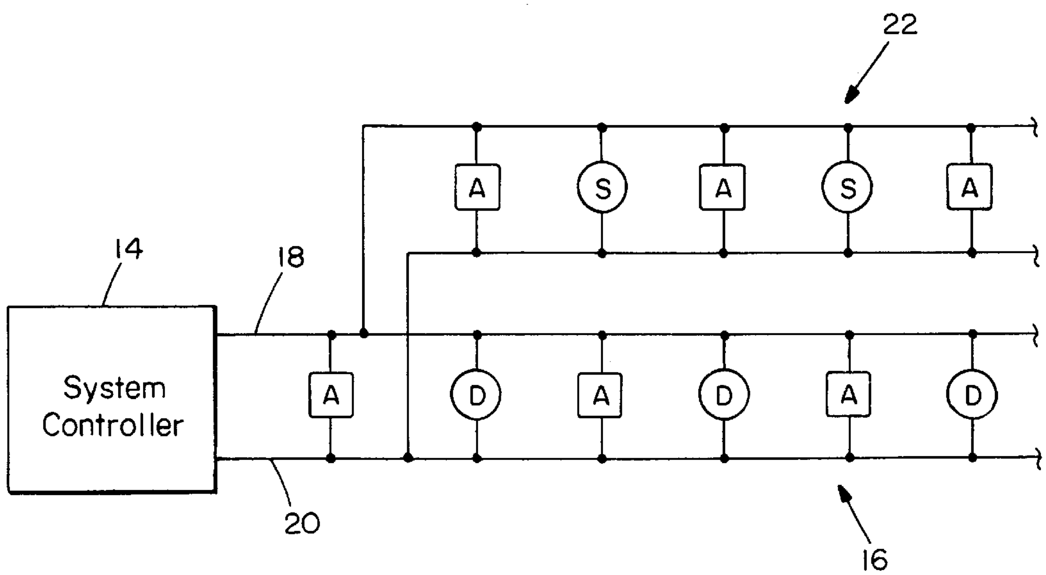
FIG. 2 illustrates an alarm system embodying an alternative preferred embodiment of the present invention.

FIG. 2 illustrates an alternative embodiment of the present invention wherein the detectors D are placed on the same NAC 16 as the notification appliances 24. This feature of the invention provides the immediate advantage of reducing wire material and installation costs.

The notification appliances 24 of the present invention are operated through commands or polls received over the NAC 16 from the system controller 14. Each notification appliance 24 transfers identification, configuration, and status messages to/from the system controller 14. The format of the communication message or poll between each notification appliance 24 and the system controller 14 can comprise a first synchronization signal, a command signal identifying a particular poll number, a data field which may include an address of a particular notification appliance, and a second synchronization signal. The notification appliance 24 or appliances being addressed by the system controller 14 would then respond according to the Poll that was directed to the appliance(s). An exemplary listing of various polls that the present invention is capable of performing is found in Table 2 infra.

Figure 3:
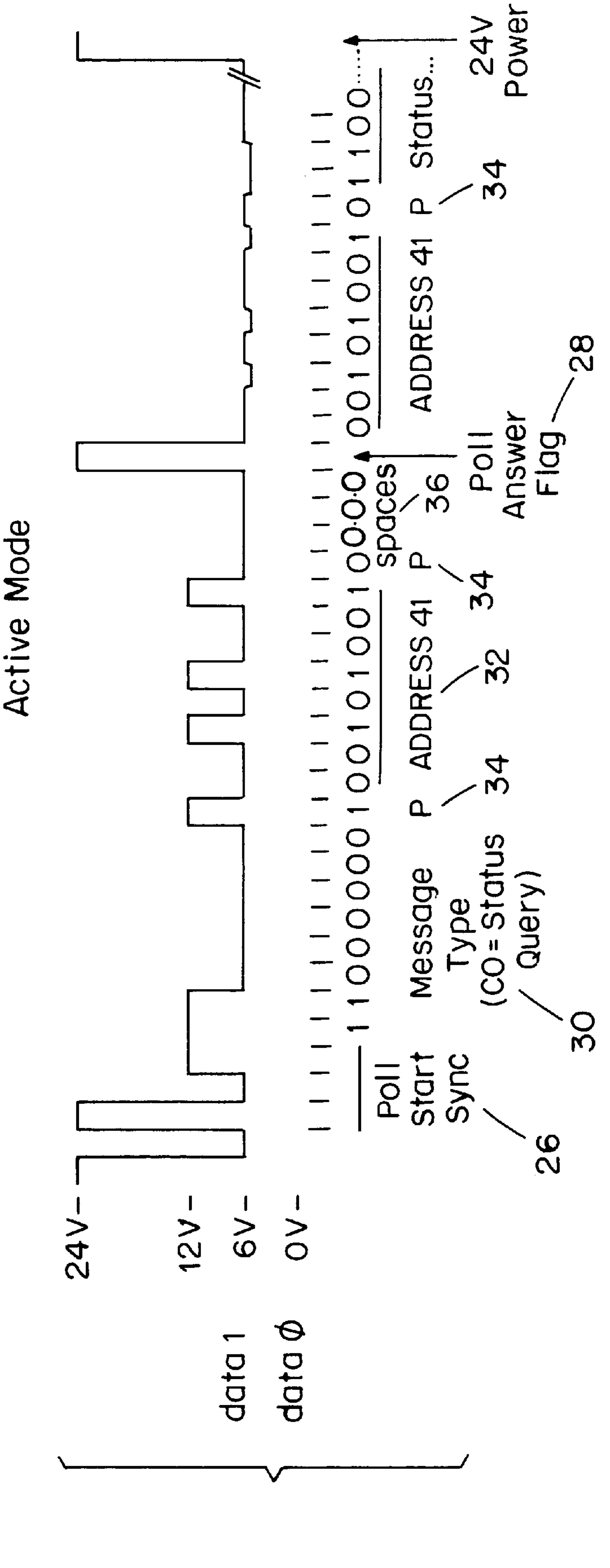
FIGS. 3 and 4 illustrate communication between a system controller and a notification appliance with the alarm system in an ACTIVE mode and STANDBY mode, respectively.
Figure 4:
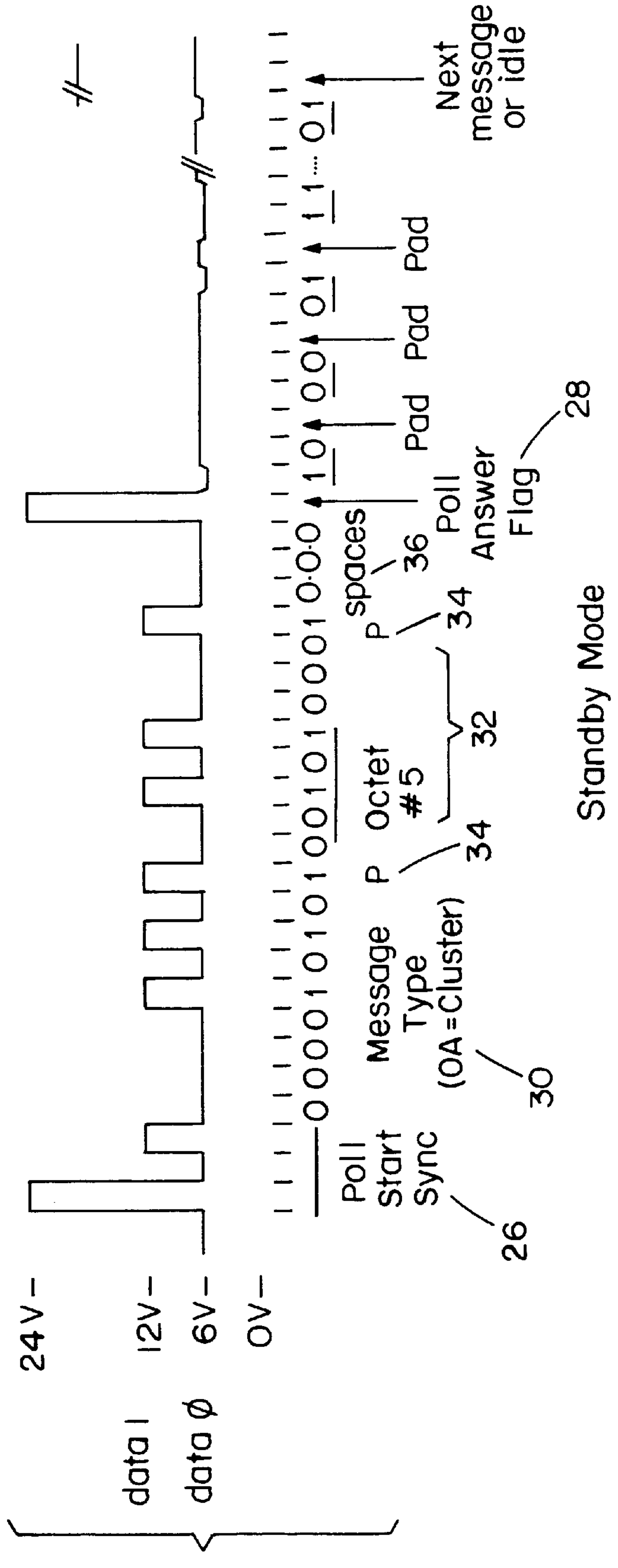

The alarm system of the present invention includes two normal modes of operation: ACTIVE mode and STANDBY mode, as illustrated in FIGS. 3 and 4, respectively. In the STANDBY mode, the system controller 14 applies a first voltage level of approximately 8 VCD (or data 0) to the NAC 16 to provide only enough power to support two-way communications between the system controller and the notification appliance(s). In the ACTIVE mode, the system controller 14 applies a nominal 24 VCD to the NAC 16 to supply power to operate the audible and/or visible alarms of each notification appliance but drops the applied voltage to 8 VCD during communication with the appliances.

In the preferred embodiment of the present invention, each message from the system controller 14 begins with a first synchronization signal 26, or SYNC(p), that acts as a flag to signal the notification appliances on the NAC 16 that a message is forthcoming. The command signal 30 and data field 32 follow the SYNC(p) 26. A parity bit 34 may be provided before and after the data field 32 for detecting communication errors. A second synchronization signal 28, or SYNC(r) signal, is provided after the data field 32 for re-synchronizing and prompting immediate notification appliance response for those messages that require a response. It should be noted that all Polls have both the SYNC(p) signal 26 and SYNC(r) signal 28, even if no response is required from the notification appliance 24. A 3-bit time interval 36 is provided between the last bit sent from the system controller 14 and the SYNC(r) signal 28 to provide the addressed notification appliance 24 time to process the message and prepare an appropriate response.

In the preferred embodiment of the invention as shown in FIGS. 3 and 4, the system controller 14 communicates digital data to the notification appliances 24 using a three level voltage signal: 24 volts, data 1 (preferably in the range of about 11 to 14 volts and more preferably about 13 volts), and data 0 (preferably in the range of about 7 to 9 volts and more preferably about 8 volts). Both the SYNC(p) 26 and SYNC(r) signal 28 comprise a fixed length pulse of power signal from the system controller 14 to and from Data 0 to 24 volts. Because other data communications use other voltage levels to communicate, the SYNC(p) 26 and SYNC (r) 28 signals form a unique event to either start communication or prompt a response from the notification appliances 24.

More specifically, SYNC(p) 26 comprises 3 elements: a fixed length 24 volt pulse, a data 0 pulse, and a data 1 pulse. The fixed length 24 volt pulse begins from the data 0 level and is used to "wake up" a notification appliance 24 that is in a "sleeping" mode (to be described below). The SYNC(P) signal 26 width is approximately 1000 us which allows time for the notification appliances to prepare for the upcoming message. The data 0 and data 1 bit widths are dependent upon the bit rate used by the system controller 14 over the NAC 16. In the preferred embodiment, data 0 and data 1 are each 250 us in width.

SYNC(r) signal 28 comprises a single fixed length (500 us) 24 volt pulse and also begins from the data 0 level. The transition between data 0 and 24 volts is intended to give the addressed notification appliances 24 a new point to sync up to.

Figure 5:
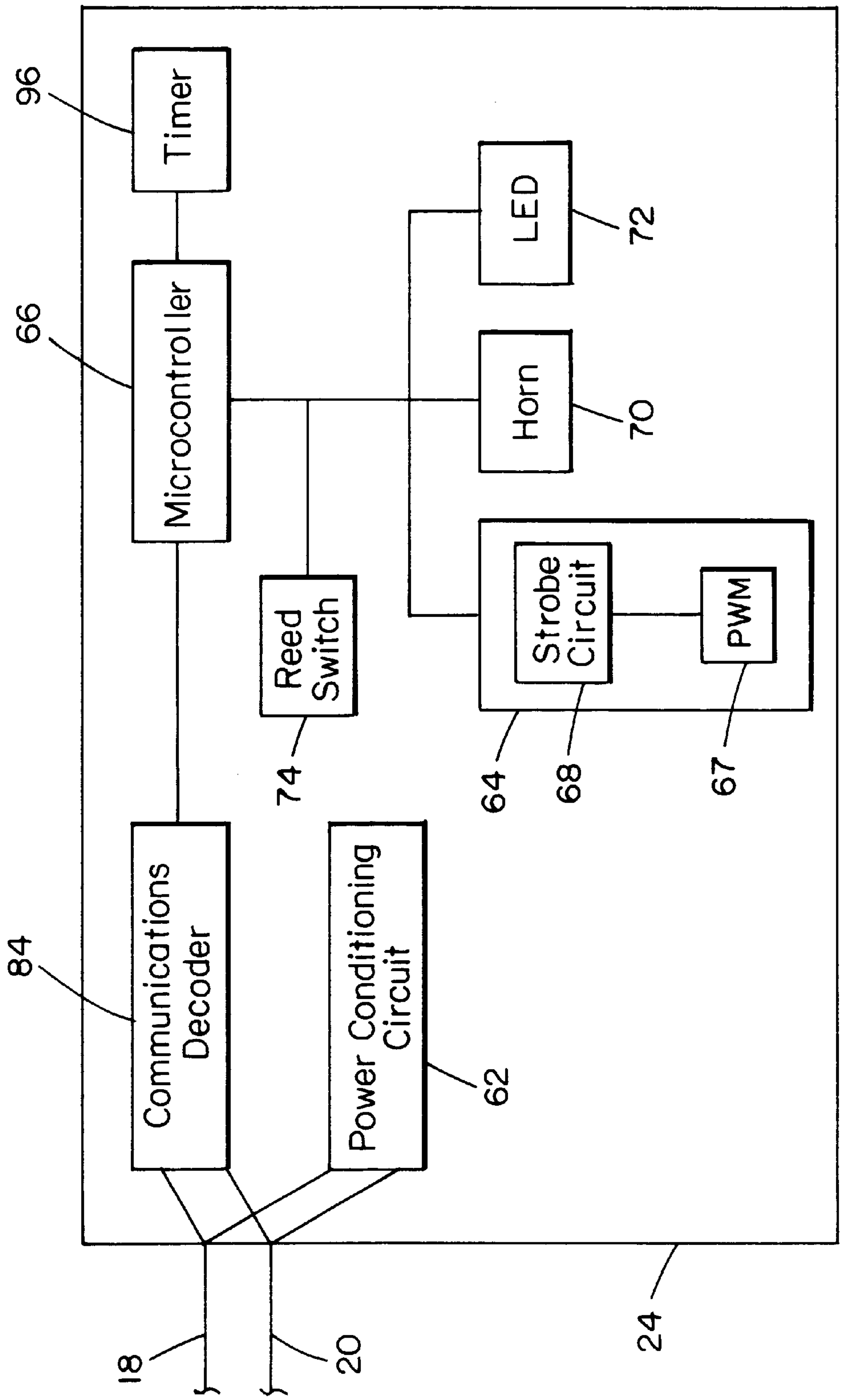
FIG. 5 illustrates, in block diagram, an exemplary notification appliance.

FIG. 5 is a block diagram of an exemplary notification appliance. As shown, power lines 18 and 20 connect to the notification appliance 24, each power line connecting to a communications decoder 84 and a power conditioning unit 62. As understood in the art, the power conditioning unit 62 is used to maintain a constant power flow to the notification appliance 24. The communications decoder 84 is provided to interpret or decode the commands or polls received over the NAC 16 from the system controller 14. Communicating with the decoder 84 is microcontroller 66 which controls the visible notification device 64, such as a strobe, audible notification device 70, such as a horn, and indicator LED 72. A reed switch 74 is provided for testing an individual notification appliance similar to switch 114 disclosed in commonly assigned co-pending application Ser. No. 09/047,894, filed Mar. 25, 1998, the entire contents of which are incorporated herein by reference. An internal timer 96 connected to microcontroller 66 is used to control the actuation of the visual and/or audible alarm of a respective notification appliance, as will be described below. Timer 96 can be positioned within microprocessor 66.

Strobe 64 includes a strobe circuit 68 which includes a charging circuit and a firing circuit similar to those disclosed in the '492 Stewart patent. A pulse width modulator 67 is provided in strobe 64 to control the charging circuit. Microcontroller 66 turns the power to the PWM 67 on/off at the beginning/end of a strobe sequence.

Standby Mode

STANDBY mode of operation is used except when ACTIVE mode of operation is actuated. All communication tasks or messages may be performed in the STANDBY mode of operation including the following which will be described below:

- Notification device identification
- Notification device configuration
- Group assignment
- Group control
- Any diagnostic functions
- Status polling
- Detailed status query
- Primary notification device On/Off by notification appliance/group
- Indicators On/Off by notification appliance In the preferred embodiment of the present invention, each notification appliance 24 on the NAC 16 is polled at least once over 4.0 seconds in STANDBY mode to ensure that any status changes in any notification appliance(s) can be identified quickly, so that additional messages may be sent within 4.0 seconds.

Active Mode

The system controller 14 wanting to turn on a notification appliance or appliances 24 on the NAC 16 must enable the selected device(s) via command Polls, then transition the voltage level on the NAC 16 from a STANDBY mode to an ACTIVE mode by raising the steady-state voltage to the 24 V level at the completion of each Poll/response cycle (see FIG. 3). Notification appliances at the enabled addresses will then turn on their notification devices after a 24 V power detection for 1 ms is detected. Steady state voltage verification must be accomplished after each Poll cycle for the notification appliance 24 to operate the notification device.

In the preferred embodiment of the present invention, a Poll is sent every 250 ms while the system is in the ACTIVE mode. This allows full power transfer to enabled notification device loads most of the time, e.g, outside of a Poll. It should be noted that the only time that the line voltage level is at 24 V during the Poll cycle is for the fixed duration of the SYNC(p) 26 and SYNC(r) 28 signals. Thus, it is beneficial to limit the amount of polling during the ACTIVE mode because each ACTIVE mode poll is a break in the transfer of notification device power to the notification appliances 24.

The system controller 14 can turn more notification devices of additional notification appliances 24 on or off by issuing additional commands without needing to transition to the STANDBY mode. The system controller 14 may also turn off all the notification devices on the NAC 16 at once by failing to return the voltage level to 24 V between Polls. Each notification appliance 24 is programmed to disconnect their notification device loads from the power lines 18 and 20 when the line voltage is detected to have dropped to the data 0 level.

Notification appliances 24 operating their respective notification devices must interrupt current draw from power lines 18 and 20 when SYNC(p) signal 26 is detected. More specifically, notification appliances 24 must stop notification device current draw when the first bit (i.e., the 24 V pulse) of the SYNC(p) signal 26 is detected, then validate the second and third bits or ("0" and "1"). If the notification appliance receives a valid SYNC(p) 26, it disables notification device current draw from the NAC 16 until the voltage level is again verified above the 24 v threshold for the required duration. If no valid SYNC(r) signal 28 is detected, the enabled notification device is allowed to draw current from NAC 16 as soon as the line voltage returns to 24 V for the required duration.

The following communications may take place in the ACTIVE mode:

Status polling

Detailed status query

Notification appliance identification

Primary notification device On/Off by notification appliance/Group

Selected diagnostic functions

Sync poll

Grouping of Notification Appliances

By means of a DIP switch, each notification appliance 24 is assigned an address that is unique on a particular NAC 16. The system controller 14 communicates with each notification appliance 24 using these addresses. One aspect of the present invention is to organize the notification appliances 24 of a NAC 16 into functional Groups, which is advantageous for control purposes. For example, one Group may comprise "All Strobes," while another may comprise "First Floor Audible Alarms." A Group, also known as a "virtual NAC," may comprise notification appliances 24 which are located on different NACs 16.

The advantage of grouping is to provide accelerated actuation of the appliance(s) of each notification appliance 24 belonging to the particular Group. Otherwise, each notification appliance 24 would have to be individually addressed, which is time-consuming, especially during alarm conditions.

Figure 6:
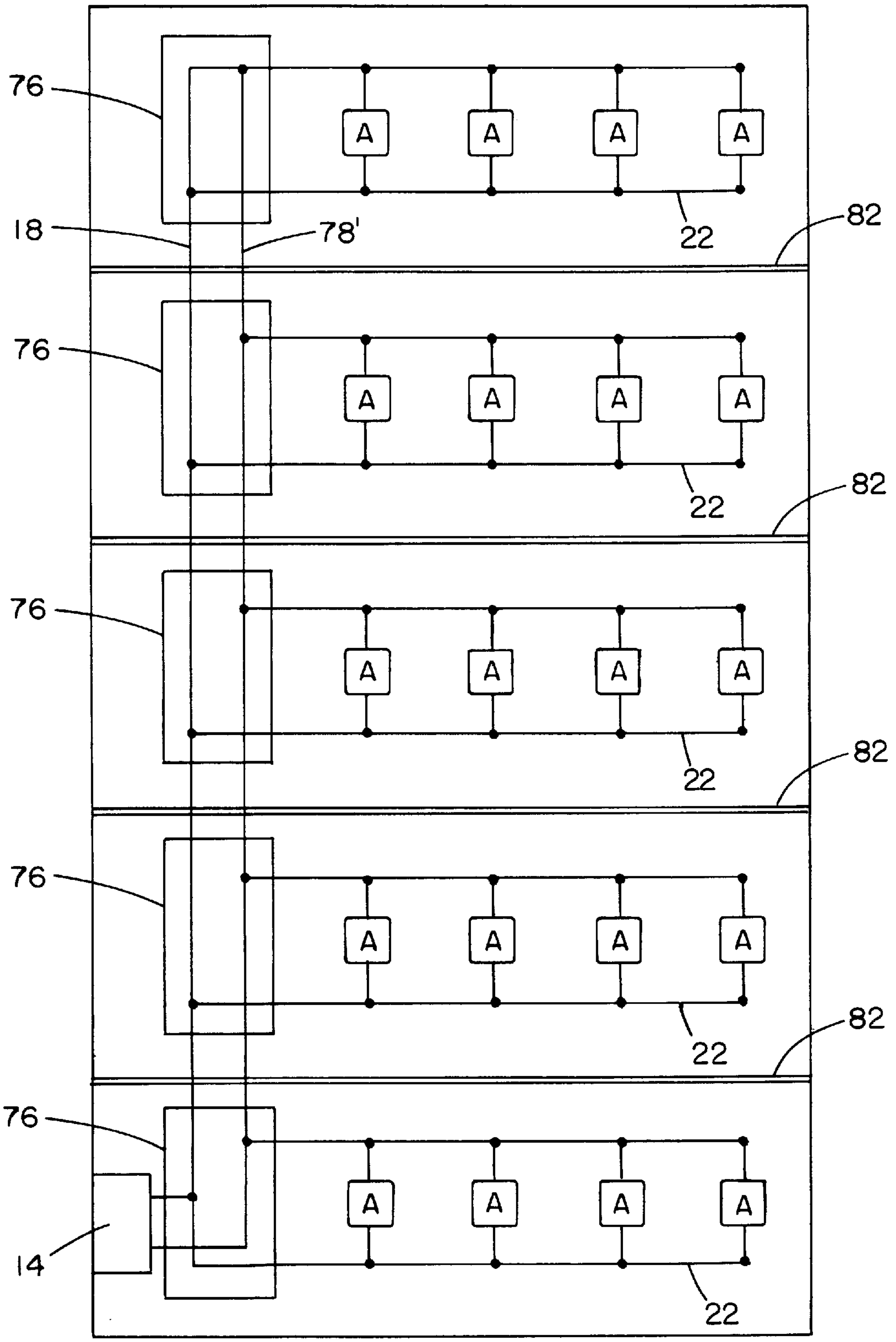
FIG. 6 is a plan view of the alarm system of the present invention installed in a building.

FIG. 6 illustrates the alarm system of the present invention as installed in a multiple floor 82 building. The system controller 14 is connected to a pair of power lines 78, 78', commonly referred to as a riser. Multiple single-ended stub circuits 22 are connected to the riser, each circuit having one or more notification appliances 24 connected thereto. Also illustrated is the use of an isolator 76, which may be provided on each floor 82, or even between as many notification appliances 24 as is economically feasible for a particular alarm system. Generally, the isolator 76 includes circuitry for detecting a short circuit in the particular stub circuit 22 or notification appliance 24 it is programmed to monitor. In the event of a short in the stub circuit 22 or notification appliance 24, the isolator 76 automatically disconnects the respective notification appliances 24 from the riser 78, 78', while maintaining power to the remaining notification appliances in the alarm system. Advantageously, the isolator 76 may be used to pinpoint earth faults in the alarm system.

Figure 7:
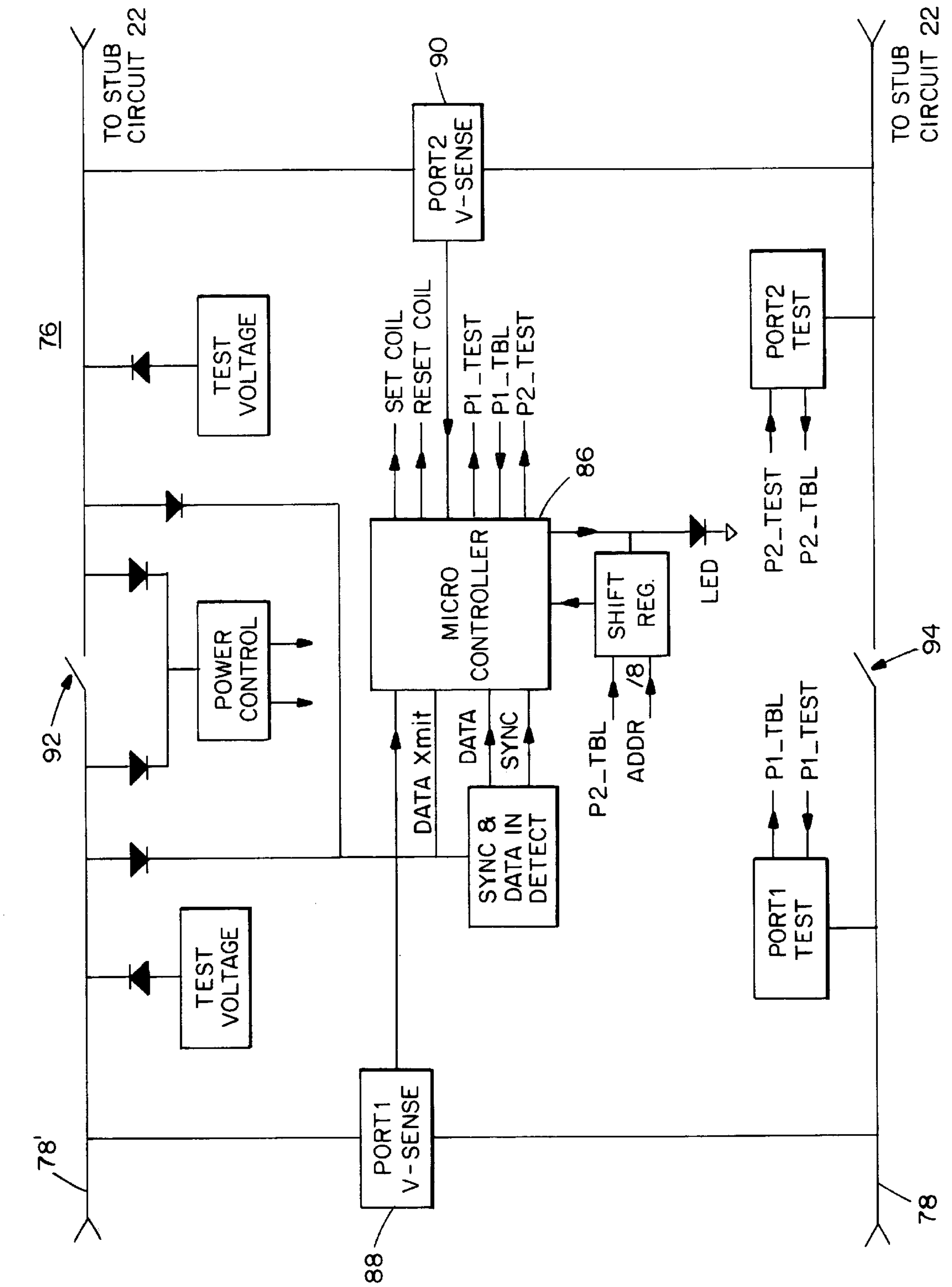
FIG. 7 illustrates, in block diagram, the isolator shown in FIG. 6.

The isolator 76 is illustrated in more detail in FIG. 7. Generally, the isolator 76 includes a first port 88 and a second port 90 and a set of contacts 92 and 94 which connects/separates the ports from the riser 78, 78'. The function of isolator 76 is driven by microcontroller 86 with control firmware that monitors hardware circuits which report the status of each port. As described above, isolator 76 takes commands from system controller 14 regarding the open/closed position of the contacts 92 and 94. Thus, system controller 14 can sequentially close contacts 92, 94 of each isolator to connect a new segment of the NAC 16, thereby allowing any faults in the NAC to be pinpointed.

In the preferred embodiment of the present invention, a total of 64 groups are possible on a given NAC 16. Five of the 64 groups are "default" groups and are illustrated in Table 1 below:

TABLE 1

| Group Name | Group ID |
|---|---|
| ALL NOTIFICATION DEVICE OUTPUTS | 0 |
| ALL HORNS | 1 |
| ALL SPEAKERS | 2 |
| ALL VISIBLE | 3 |
| All ISOLATORS (per NAC) | 4 |

A further aspect of the present invention is to assign each notification appliance 24 to a specific Sub-Group. That is to say, besides being assigned to a default group, each notification appliance 24 can be assigned up to 3 Groups in addition to the default Group. Notification appliances 24 having more than one notification device, e.g., an audible and visual alarm, can independently assign each device to a different Group (creating a total of eight assignable Groups, three for each device in addition to the two default Groups). In this manner, separate control for each notification device of a particular notification appliance 24 is possible. In accordance with the present invention, every Group is either ON, OFF, or DISABLED.

Cluster Service Polls

Cluster Service Polls are polls from the system controller 14 which are used to maintain supervision of the notification appliances 24 on the NAC 16. In the preferred embodiment of the present invention, each Cluster Service Poll is directed to eight consecutive notification appliance 24 addresses. After the Cluster Service Poll (which will be detailed below) is sent, which includes a SYNC(r) signal 28 prompt pulse, the system controller 14 issues a SYNC(r) signal 28 and waits for a response from each address. If present, each of the notification appliances 24 at that address cluster responds to the prompt pulse with a 3 bit status word consisting of a 2 bit status code followed by a pad bit. For example, as indicated in the section below entitled "Message Field Descriptions," the notification appliance 24 could respond with a two bit code flag indicating that the notification appliance is normal (with notification devices on or off), the notification appliance is in need of service or in Test mode, or a No response, indicating the notification appliance received the Cluster Service Poll in error, there is missing notification appliance, or an empty address. How the system controller 14 responds to an error message resulting from a Cluster Service Poll depends on whether the alarm system is in STANDBY or ACTIVE mode.

If the alarm system is in STANDBY mode, the system controller 14 may immediately issue a Notification Appliance Status Query Poll to the notification appliance 24 that responded with an error to the Cluster Service Poll. The system controller 14 may also elect to come back to the notification appliance 24 after Cluster Service Poll cycle has been completed for the remaining notification appliances 24. In the preferred embodiment of the present invention, the system controller 14 will become aware of any status changes of any notification appliance 24 within 4.0 seconds.

If the alarm system is in ACTIVE mode, the system controller 14 only issues a Notification Appliance Status Query Poll to any notification appliances 24 that respond with an error after the controller has obtained a status report from all the notification appliances on the NAC 16, i.e., after the controller has completed the Cluster Service Poll cycle. If the notification appliance responds with an error after two consecutive Cluster Service Polls, the system controller 14 registers a "Trouble" condition with respect to that notification appliance. If the notification appliance 24 responds correctly to the first or second Detailed Status Query Poll, the system controller is programmed to attempt to bring the notification appliance back (i.e., recover) to the proper operational state. This may be accomplished by using one or more of the following Polls: Notification Appliance Configuration Command, Group Assignment Commands, and Actuators ON/OFF by Group/notification appliance (all described below). Notification appliances 24 may only be declared "Normal" after this recovery process is complete. Since NAC 16 bandwidth is limited during the ACTIVE mode, the recovery process commands are only issued after the Cluster Service Polls and other command polls for notification appliances 24 in good standing have been completed.

Each addressed notification appliance 24 sends the 2-bit response after the SYNC(r) signal 28 at a time determined by the modulo-8 residue of that notification appliance's address. For example, if the residue is 0, then that notification appliance responds immediately after the SYNC(r) signal 28; if the residue is 7, then that notification appliance waits for 7×3 or (21) bit times, then responds.

In an alternative embodiment of the present invention, the system controller 14 generates a single SYNC(p) signal 26 and eight SYNC(r) signals 28 with each notification appliance 24 of the Cluster responding after a designated SYNC (r) signal 28.

It should be noted that Cluster Service polling cycles are directed at all addresses regardless of the result of individual polls in the individual polls in the ACTIVE mode. However, the Cluster Service polling cycle may be interrupted by other message types that turn notification appliances 24 on or off.

Notification Appliance Circuit Initialization

Upon initialization of the alarm system, the system controller 14 sends a series of Cluster Service Polls to the notification appliances 24 on the NAC 16. In the preferred embodiment, a total of 63 notification appliances are placed on the NAC 16, so that eight Cluster Service Polls would be needed to poll the 63 notification appliances. Each notification appliance 24 is programmed to self-initialize on power-up events in a diagnostics mode. This is done to have an active response on the NAC 16 and to keep the notification appliances in a "benign" (off/open) state. That is to say, each notification appliance 24 is in a responsive state ready to respond to a Cluster Service Poll directed at it. The system controller 14 completes the polling of all address and compiles a listing of all the notification appliances 24 that responded to the Cluster Service Polls.

The system controller 14 then compares the number of active notification appliances' addresses to the number that it is programmed to have. Alternatively, the system controller 14 can compare the actual roster of active notification appliance addresses detected on the NAC 16 to the address map it is programmed to have. If these numbers are equal, the system controller 14 sets up each notification appliance by first sending a Notification Appliance Status Query Poll to determine the type and status of the notification appliance 24 at each active address. The system controller 14 then sends Notification Appliance Configuration and Group Assignment commands for the notification appliances 24 that require them. Once a notification appliance 24 has successfully completed this sequence, it is taken out of the diagnostics mode, so it can enter the "sleep" state between Polls, thereby minimizing power consumption.

If fewer notification appliances 24 are detected in the Cluster Service Poll than expected, Notification Appliance Status Query Polls are sent to each address to determine notification appliance type and status. If these polls show notification appliances 24 still missing, the system controller 14 registers a "Trouble" condition and continues initialization of the notification appliances 24 present.

In the event that extra notification appliances 24 are detected in the Cluster Service Poll cycle, Notification Appliance Status Query Polls are sent to all addresses to determine notification appliance type and status. If these polls shows that there are still extra notification appliances, the system control 14 registers a "Trouble" condition and continues initialization of the notification appliances that are programmed to be on the NAC 16.

When the initialization sequence is completed for all the active addresses, the system controller 14 reverts to continual Cluster Service polling cycles until an event causes another operation.

Sleep Mode

A properly configured NAC 16 engages in simple status polling most of the time. Accordingly, STANDBY mode includes a mechanism that requires notification appliance to go to "sleep" after poll cycles and to "wake-up" on detection of a SYNC(p) signal 26. This sleeping mode reduces overall power consumption on the NAC 16.

Upon power-up, a notification appliance 24 is not enabled to transition to sleep until after receipt of a Notification Appliance Status Query and Response Acknowledge poll sequence. This means that the system controller 14 must signal successful receipt of that notification appliance's configuration before initialization of the notification appliance is complete. Once a notification appliance 24 is enabled, the transition to sleep is made when the notification appliance does not receive a 24 V pulse for a predetermined amount of time, for example, 10 ms. That is to say, if there is an interval of time of more than 10 ms between synchronization pulses, the device is programmed to go to "sleep" to conserve power. Upon receipt of SYNC(p) signal 26, the notification appliance 24 is programmed to "wake up" and monitor the NAC 16. In the preferred embodiment of the present invention, the notification appliance 24 can make the transition out of a "sleep" mode and be ready to time the bit interval within 500 us after the leading edge of the SYNC(p) signal 26.

Once a notification appliance has been enabled to turn on or actuate, a notification device (e.g., a visual alarm [strobe] or an audible alarm [horn]) is programmed not to transition to sleep. Once a timeout from the last SYNC signal is exceeded, a notification appliance that is still enabled to turn on a notification device logs this condition, disables sleep mode, and responds to the next Cluster Service Poll directed at it with a need-service response.

Error Detection and Response

As shown in FIGS. 3 and 4, the system controller 14 uses an odd parity bit 34 at the end of certain fields to detect errors in transmission. The system controller 14 is also responsible for detecting an error where more than one notification appliance 24 answers to a particular address. This condition is discovered by monitoring the current levels during notification appliance response.

When a notification appliance 24 detects a communication error or invalid data field 32 in a message from the system controller 14, the notification appliance neither acts on nor responds to the message. Such errors may include a parity error, a truncated Poll message, an excess of fields for a particular message, or invalid field data, e.g., fixed bits wrong or contents of message inconsistent with type of notification appliance 24.

The system controller 14 will respond to a detected error in accordance to a set of programmed instructions, such instructions being dependent, for example, on what mode the system controller is in and which Poll is being attempted. In general, a particular Poll that produces an error causes the system controller 14 to re-try the Poll. The system controller 14 will only register a "Trouble" condition for a particular notification appliance 24 after two or more consecutive Polls to the notification appliance result in errors. These errors may include any combination of parity error, multiple responses detected, or response timeout (failure of notification appliance to respond to the Poll). It should be noted that an error resulting from a Cluster Service Poll does not count for purposes of attaining two consecutive errors. If a "Trouble" condition is registered with respect to a particular notification appliance 24, the system controller 14 may later attempt to regain communications with that device but must re-initialize the notification appliance before registering the notification appliance as "Normal."

Message Formats

Table 2 below provides a non-exhaustive list of Polls available to the system controller 14.

notification appliance(s) 24 to turn on their respective notification devices, and continues to periodically send the Sync Poll while the NAC is in the ACTIVE mode. In the preferred embodiment, communication between the system controller 14 and notification appliances 24 are accomplished every 245 ms. The notification appliance(s) 24 on the NAC 16, operating their respective notification device(s), reset their respective timers to the nearest multiple of the 245 ms interval. Thus, the timer 96 of every notification appliance 24 on the NAC 16 is synchronized to the same time base. The system controller is programmed to send the Sync Poll at a minimum rate of one poll every 3.92 seconds in the ACTIVE mode.

It is preferable that a notification appliance 24 that controls a notification device maintain the internal timer 96 with a range of 7.84 seconds at an accuracy of +/−5 ms over the 245 ms period that separates consecutive polls in the ACTIVE mode. This allows a notification appliance 24 to miss a Sync Poll at the minimum rate, update the value at the next poll, while maintaining synchronization accuracy throughout the ACTIVE mode polling.

TABLE 2

| POLL # | POLL | RESPONSES | ACTIVE MODE | STANDBY MODE |
|---|---|---|---|---|
| FF | Sync | None | X | X |
| C0 | Notification Appliance Status Query | Detailed status response | X | X |
| C7 | Notification Appliance Configuration Query | Notification appliance type & configuration status | — | X |
| C1 | Notification Appliance Group Checksum Query | Checksum of assigned group IDs | — | X |
| C8 | Notification Appliance Group I.D. Query | Requested group ID | — | X |
| C4 | Response Acknowledge | Address echo | X | X |
| F1 | Notification Appliance Configuration Cmd #1 | Address echo | — | X |
| E4 | Notification Appliance 1st Notification Device Group Assignment Cmd | Address echo | — | X |
| E3 | Notification Appliance 2nd Notification Device Group Assignment Cmd | Address echo | — | X |
| OA | Cluster Service Poll | M[8] residue gated response | X | X |
| D8 | Actuators On/Off by Group Cmd | None | X | X |
| E1 | Actuators On/Off by Notification Appliance Cmd | Address echo | X | X |
| FE | Notification Appliance Reset Cmd | Address echo | X | X |
| F4 | Notification Appliance Configuration Cmd #2 | Address echo | — | X |

The first column indicates the Poll Number in hexadecimal format. The second column indicates the Poll Name wherein "queries" request information from a notification appliance and "commands" configure or direct a particular action to a device(s). The third column indicates the response that is expected from a notification appliance according to the respective poll. The fourth and fifth columns indicate where the Poll is valid in the ACTIVE mode and/or STANDBY mode. Provided below are brief explanations of each Poll.

Sync Poll

The Sync Poll is used to synchronize all the notification appliances 24 on a particular NAC 16 to a system controller 14 generated four second clock. The system controller 14 sends out the Sync Poll along the NAC 16 after enabling the Any notification appliance(s) that has its notification device(s) enabled and has not yet received a valid Sync poll in a predetermined time, e.g., 7.84 seconds, is programmed to send a "Need Service" response in the next Cluster Poll directed at it. If that notification appliance(s) 24 has been in ACTIVE mode for that entire time, then it is programmed to activate the enabled device(s), which would then be synchronized only to the 245 ms ACTIVE mode poll timing sequence. The notification appliance(s) 24 continues in this manner until it gets a Sync Poll, or it receives a command to shut off the notification devices, or detection of a transition out of ACTIVE mode (i.e., no more 24 volts).

In the event the system controller 14 needs to leave the NAC 16 in STANDBY for a period exceeding 245 ms while maintaining the notification device(s) enabled, the controller updates the notification appliance(s) with a Sync poll before entering the ACTIVE mode. The format of the Sync Poll is given below:

| | | | | | | | |
|---|---|---|---|---|---|---|---|
| [SYNC(p)] [POLL#(FF)][P] [8bit descriptor for 4 sec clock][P] {3sp} [SYNC(r)] | | | | | | | |
| [S] | [11111111] | [1] | [8bits] | [P] | 000 | 500us | |
| 500us+2 | 8 | 1 | 8 | 1 | 3 | =500us+23 bits | |

As shown, the Sync Poll begins with the 3-bit synchronization SYNC(p) signal 26, as do all the Polls. Following SYNC(p) signal 26 is an 8-bit command signal 30 which identifies the Poll number ("FF") in hexadecimal format. A parity bit 34 may follow the command signal 30 for purposes of error detection. A data field 32 follows the parity bit 34 and comprises an 8-bit descriptor for a four second clock for purposes of resetting timer 96 located at each notification appliance 24. The 8-bit descriptor field represents units of 16.384 ms. All notification appliances 24 that correctly receive this poll replace their modulo four second clock value of timer 96 with the new value received in the Sync Poll. This includes setting any fraction of the 16 ms interval to zero. The timer 96 of notification appliance 24 may control actuation of the visual and/or audible alarm of a respective notification appliance. As heretofore known, it is exceptionally beneficial, for example, as discussed in the '492 Stewart patent, to synchronize the actuation of the visual alarms. Thus, the present invention provides a method of synchronizing the actuation of visual and audible alarms. The data field 32 is followed by a second parity bit 34 which is also used for purposes of error detection. A 3-bit spacer may be provided after the data field 32. Thus, a total of the 500 us SYNC(p) signal 26 followed by 23 bits comprises the format of the message to this point. A 500 us SYNC(r) signal 28 follows the 3-bit spacer. No response is required from the notification appliance 24.

If a notification appliance 24 in the ACTIVE mode counts more than eight seconds without receiving a Sync Poll, it is programmed to signal a "Need Service" response at the next Cluster Service Poll.

Notification Appliance Status Query Poll

The Notification Appliance Status Query Poll solicits status information from an individual notification appliance 24. The format of the query and response is given below:

| | |
|---|---|
| Format: | [SYNC(p)] [POLL#(C0)[P] [ADDR][P] {3sp} [SYNC(r)] |
| Response: | [ADDR][P] [Notification Appliance Type][P] [Stat][P] |

As shown, the Notification Appliance Status Query Poll begins with SYNC(p) signal 26 followed by the command signal 30, which in this case would indicate "CO" identifying this particular poll. The data field 32 includes an address of a particular notification appliance 24. A 3-bit spacer may follow the data field 32. A SYNC(r) signal 28 follows the 3-bit spacer. The response includes a data field 32 indicating the address of the particular notification appliance 24, and a first and second field indicating the notification appliance type 38 and status 40. More particularly, the notification appliance type field is an 8-bit binary encoded identification code which, according to a look-up table, identifies a specific type of notification appliance 24. Such notification appliances may include a ceiling or wall mounted strobe, an audio/visual device, a speaker/visual device, a horn, or an isolator.

The status field is also an 8-bit field indicating the status of the particular notification appliance. FIGS. 8A–8D indicate the significance of each bit with respect to a particular notification appliance. More specifically, FIG. 8A indicates the status of a wall or ceiling mounted strobe or an S/V device. The significance of each bit within each bit position is given below:

Notification appliance configured:

1=notification appliance has been configured since last device power-up/reset, Reset Command 0=not configured Diagnostics Busy:

1=notification appliance has been configured since last device power-up, reset, Rest Command 0=not configured (Re-setting this bit forces the Needs Service response to a Cluster Poll. This bit remains reset until the notification appliance received a notification appliance Configuration Command.)

Device Busy:

1=busy responding to Manual input (only valid with Diagnostics enabled)

0=ready

Manual Input Detected

1=input detected since last Response Acknowledge Poll (described below)

0=no unacknowledged manual inputs (The setting (0-→transition) of this bit forces the Needs Service response to a Cluster Poll. This bit remains set until the device receives a Response Acknowledge Poll.)

LED Status:

1=LED lit

0=LED off

Primary Output 1:

1=output operating

0=not operating

Primary Output 1—Strobe:

1=output operating

0=not operating

FIG. 8B is similar to FIG. 8A but indicates the status of an A/V notification appliance, which may include wall or ceiling mounted notification appliances, the only difference being that bit position number 1 indicates Primary Output 2, which is the audible notification device on the A/V device. A "1" indicates the audible is operating and a "0" indicates the audible is OFF.

FIG. 8C is also similar to FIG. 8A but indicates the status of a notification appliance having an electronic horn notification device. In this case a "1" in the Primary Output 2 field (bit position 2) indicates the horn notification device is operating and a "0" indicates the device is OFF.

FIG. 8D indicates the status of an isolator 76. The significance of each bit within each bit position is given below:

Isolator Configured:

1=Isolator has been configured since last Isolator power-up, reset, Reset Command 0=not configured (Re-setting this bit forces the Needs Service response to a Cluster Poll. This bit remains reset until the Isolator receives a Isolator Configuration) Command.

Isolator Busy:

1=busy charging the trigger coil capacitor

0=ready

Powered Port#:

0=powered from port.

1=powered from port 2

(Defaults to 0 when contacts are closed.)

LED Status:

1=LED lit

0=LED off

Contacts:

1=contacts closed

0=open (A state change at this bit forces the Needs Service response to a cluster Poll.)

Other Port [.1,.0]:

00=normal ("good voltage") at other (non-powered port)

01=short circuit at other port

10=reserved

11=open circuit at other port (A state change of these bits forces the Needs Service response to a Cluster Poll.)

As shown, a parity bit 34 may follow all fields except the SYNC(p) 26 and SYNC(r) 28 signals.

Notification Appliance Configuration Query Poll

The Notification Appliance Configuration Query Poll solicits configuration information from a particular notification appliance 24. The format of the query and response is given below:

| | |
|---|---|
| Format: | [SYNC(p)] [POLL#(C7)][P] [ADDR][P] [3sp] [SYNC(r)] |
| Response: | [ADDR][P] [Config][P] |

As shown, the Notification Appliance Configuration Query Poll begins with a SYNC(p) signal 26 followed by a command signal 30 ("C7") identifying this particular poll. The data field 32 includes an address of a particular notification appliance 24. A 3-bit spacer may be provided after the data field 32. A SYNC(r) signal 28 follows the 3-bit spacer. The response includes a data field 32 indicating the address of the particular notification appliance 24, and a field indicating a configuration (i.e., status) of the individual notification appliance 24. The configuration field is notification appliance type specific as shown in FIGS. 9A–D.

More specifically, FIG. 9A indicates the configuration of a wall or ceiling mounted strobe or an S/V notification appliance. The significance of each bit within each bit position is given below.

Strobe Mode:

0=normal 1 flash per second

1=Sync 1 flash/sec. to horn cadence if temporal.

Diagnostics Mode:

0=manual input disabled; normal function.

1=manual input enabled; manual input will force LED annunciation of address, and be reported on communication channel.

LED Mode:

0=LED will follow channel on/off commands with initial state off

1=LED will blink on valid Poll

FIG. 9B indicates the configuration of an A/V device, which may include a wall or ceiling mounted device. The significance of each bit within each bit position is given below:

Strobe Mode:

0=normal 1 flash per second

1=Sync 1 flash/sec. to horn cadence if temporal

Diagnostic Enable:

0=manual input disabled; normal function.

1=manual input enabled; manual input will force LED annunciation of address

LED Mode:

0=LED will follow channel on/off commands with initial state off

1=LED will blink on valid Poll

Audible output level:

1=high

0=low

Audible Coding Type (2, 1, 0):

000=temporal

001=march time

010=fast march time

011=continuous

FIG. 9C is identical to FIG. 9B and indicates the configuration of a notification appliance having a horn notification device. The significance of each bit within each bit position is also identical to the configuration set-up described above with respect to an A/V device.

FIG. 9D indicates the configuration of an isolator 76. The significance of each bit within each bit position is given below:

LED Mode:

0=LED will follow channel on/off commands with initial state off 1=LED will blink on valid Poll It should also be noted that multiple configuration fields may be used in accordance with the present invention. As shown, a parity bit 34 may follow all fields except the SYNC(p) signal 26 and SYNC(r) signal 28.

Notification Appliance Group Checksum Query

The system controller can check sub-group information from an individual notification appliance via a digital message comprising a Notification Appliance Group Checksum Query. Each notification appliance includes at least one notification device having at least one group number and an electronic circuit that decodes a multi-bit command identifying the digital message as a Notification Appliance Group Checksum Query. The electronic circuit further decodes an address field directing the digital message at the particular notification appliance. The notification appliance then responds with an indication of the group number. If the notification device includes more than one group number, then the notification appliance responds to the digital message with an indication of a summation of the group numbers.

Thus, the Notification Appliance Group Checksum Query is used to solicit sub-Group information from an individual notification appliance 24. The format of the query and response is given below:

| | |
|---|---|
| Format: | [SYNC(p)] [POLL#(C1)][P] [ADDR][P] {3sp} [SYNC(r)] |
| Response: | [ADDR][P] [Checksum#][P] |

As shown, the Notification Appliance Group Checksum Query begins with a SYNC(p) signal 26 followed by a command signal 30 ("C1") identifying this particular poll. The data field 32 includes an address of a particular notification appliance 24. A 3-bit spacer may be provided after the data field 32. A SYNC(r) signal 28 follows the 3-bit spacer. The response includes a data field 32 indicating the address of the particular notification appliance 24, and a field indicating a Checksum number. This number is an algebraic sum of up to 6 (6-bit) Group numbers. The system controller 14 compares the Checksum number to a number programmed in the controller. If the respective numbers are not equal, the controller is programmed to issue a Notification Appliance Group I.D. Query (see below). It should be noted that only the low 8 bits are transmitted. As shown, a parity bit 34 may follow all fields except the SYNC(p) signal 26 and SYNC(r) signal 28.

Notification Appliance Group I.D. Query

The Notification Appliance Group I.D. Query is used to check individual Group entries on a particular notification appliance 24. The format of the query and response is given below:

| | |
|---|---|
| Format: | [SYNC(p)] [POLL#(C8)][P] [ADDR][P] [00000_a0_g1g0] [P] {3sp} [SYNC(r)] |
| Response: | [ADDR] [P] [Slot #/Grp #] [P] |

As shown, the Notification Appliance Group I.D. Query begins with a SYNC(p) signal 26 followed by a command signal 30 ("C8") identifying this particular poll. The data field 32 includes an address of a particular notification appliance 24. Data field 32 is followed by a second data field which directs the Poll at a first or second notification device Group set and a particular Group location. More specifically, a0 indicates whether the Poll is directed to the first (0) or second (1) notification device set. The g1 and g0 bit locations indicate which Group is being requested. A 3-bit spacer 36 may be provided after the data field 48. A SYNC(r) signal 28 follows the 3-bit spacer. The response includes a data field 32 indicating the address of the particular notification appliance 24, and a Group identification field identifying the addressed Group. More particularly, the identification field is an 8-bit Group identifier where the first two bits designate which sub-Group identification (1–3) follows and the next 6 bits that have that Group number. A zero in the Grp# field means there is no sub-Group entry. As shown, a parity bit 34 may follow all fields except the SYNC(p) signal 26 and SYNC(r) signal 28.

Response Acknowledge

The Response Acknowledge Poll is used to send confirmation to a notification appliance 24 that the information sent by the notification appliance in the last Poll addressed to that notification appliance was received successfully. The system controller 14 is programmed to send this Poll in order to complete the sequence of Polls that occurs after a notification appliance 24 has signaled in a Cluster Service Poll that service is required. A notification appliance 24, which requested service because of some initial event and sent information in a Poll response, will only cease requesting service based on that initial event when it receives a Response Acknowledge.

The format of the Response Acknowledge Poll including the response is given below:

| | |
|---|---|
| Format: | [SYNC(p)] [POLL#(C4)][P] [ADDR][p] {3sp} [SYNC(r)] |
| Response: | [ADDR][P] |

As shown, the Response Acknowledge begins with a SYNC(p) signal 26 followed by a command signal 30 ("C4") identifying this particular poll. The data field 32 includes an address of a particular notification appliance 24. A 3-bit spacer may be provided after the data field 32. A SYNC(r) signal 28 follows the 3-bit spacer. The response includes a data field 32 indicating the address of the particular notification appliance 24. As shown, a parity bit 34 may follow all fields except the SYNC(p) signal 26 and SYNC(r) signal 28.

Notification Appliance Configuration Command #1

The Notification Appliance Configuration Command is used to send configuration information to an individual notification appliance 24. The format of the command including the response is given below:

| | |
|---|---|
| Format: | [SYNC(p)] [POLL#(F1)][P] [ADDR][P] [Config#1][P] {3sp} [SYNC(r)] |
| Response: | [ADDR][P] |

As shown, the Notification Appliance Configuration Command begins with a SYNC(p) signal 26 followed by a command signal 30 ("F1") identifying this particular Poll. The data field 32 includes an address of a particular notification appliance 24. Data field 32 is followed by a configuration field which is an 8-bit identification of a specific configuration of a notification appliance 24 that is being addressed. The configuration settings are notification appliance type specific and are identical to the those described above in the section entitled "Notification Appliance Configuration Query." A 3-bit spacer may be provided after the configuration field. A SYNC(r) signal 28 follows the 3-bit spacer. The response includes the data field 32 indicating the address of the particular notification appliance 24. As shown, a parity bit 34 may follow all fields except the SYNC(p) signal 26 and SYNC(r) signal 28.

Notification Appliance Configuration Command #2

The Notification Appliance Configuration Command is used to send configuration information to individual notification appliances 24 that require a second configuration command. The format of the command including the response is given below:

| | |
|---|---|
| Format: | [SYNC(p)] [POLL#(F4)][P] [ADDR][P] [Config#2][P] {3sp} [SYNC(r)] |
| Response: | [ADDR][P] |

As shown, the format of the command is similar to the Notification Appliance Configuration Command #1. Only those notification appliances 24 that require a second configuration command will respond to it. The other notification appliances 24 will not respond to this command.

Notification Appliance First Notification Device Group Assignment Command

The Notification Appliance First Notification Device Assignment Command is a Poll used to program application specific group numbers for a first notification device into an individual notification appliance 24. The first notification device, for example, may include the visible alarm (strobe) of a notification appliance. The format of the command including the response is given below:

| | |
|---|---|
| Format: | [SYNC(p)] [POLL#(E4)][P] [ADDR][P] [Slot#/Grp#2][P] {3sp} [SYNC(r)] |
| Response: | [ADDR][P] |

As shown, the Notification Appliance First Notification Device Group Assignment Command begins with a SYNC (p) signal 26 followed by a command signal 30 ("E4")

identifying this particular poll. The data field 32 includes an address of a particular notification appliance 24 and is followed by a Group identification field which is described above under Notification Appliance Group I.D. Query. A 3-bit spacer may be provided after the data field 52. A SYNC(r) signal 28 follows the 3-bit spacer. The response includes a data field 32 indicating the address of the particular notification appliance 24. As shown, a parity bit 34 may follow all fields except the SYNC(p) signal 26 and SYNC(r) signal 28.

Notification Appliance Second Notification Device Group Assignment Command

The Notification Appliance Second Notification Device Group Assignment Command is a Poll used to program application specific group numbers for the second notification device into an individual notification appliance 24, providing the notification appliance has a second notification appliance. The second notification device, for example, may include the audible output of a notification appliance. The format of the command including the response is given below:

| | |
|---|---|
| Format: | [SYNC(p)][P] [POLL#(E3)][P] [ADDR][P] [Slot#/Grp#][P] {3sp} [SYNC(r)] |
| Response: | [ADDR][P] |

As shown, the Notification Appliance Second Notification Device Group Assignment Command begins with a SYNC (p) signal 26 followed by a command signal 30 ("E3") identifying this particular poll. The data field 32 includes an address of a particular notification appliance 24 and is followed by a group identification field, which is described above under Notification Appliance Group I.D. Query. A 3-bit spacer may be provided after the data field 32. A SYNC(r) signal 28 follows the 3-bit spacer. The response includes a data field 32 indicating the address of the particular notification appliance 24. As shown, a parity bit 34 may follow all fields except the SYNC(p) signal 26 and SYNC(r) signal 28.

Cluster Service Poll

As described above in the section entitled "Cluster Service Polls," the Cluster Service Poll is used to solicit general status information from a cluster of 8 consecutive notification appliance addresses. The format of a poll including the response is given below:

| | |
|---|---|
| Format: | [SYNC(p)] [POLL#(OA)][P] [Octet-Addr][P] {3sp} [SYNC(r)] |
| Response: | 8 slots of [cr1,cr0,pad] |

As shown, the Cluster Service Poll begins with a SYNC (p) signal 26 followed by a command signal 30 ("0A") identifying this particular poll. A cluster group address field follows the command signal which is an 8-bit field which identifies a Group of 8 contiguous notification appliances 24 to be cluster polled. A 3-bit spacer may be provided after the cluster group address field. The response includes a Cluster Response field which is a 2 bit response indicating a summary status, also described above. As shown, a parity bit 34 may follow the command signal 30 and cluster group address field 54.

Actuators on/off Group Command

The Actuators On/Off by Group Command is used to address a Notification Appliance Group to modify the On/Off states of their notification devices and indicator. The format of this command is given below:

| | |
|---|---|
| Format: | [SYNC(p)] [POLL#(D8])[P] [Grp#][P] [P/S State][P] {3sp} [SYNC(r)] |
| Response: | None |

As shown, the Actuators On/Off by Group Command begins with a SYNC(p) signal 26 followed by a command signal 30 ("D8") identifying this particular poll. Command signal 30 is followed by a group number field which is an 8-bit Group identifier where the first 2 bits are hard coded 11 binary, and the next 6 bits have a particular Group number. The group number field is followed by P/S state field which is an 8-bit command word for the notification devices and indicator (i.e., LED) of the notification appliances of the addressed Group. The format of the P/S state field is [P1P1 P2P2 CCC], where the format is indicative of the following:

P1P1: 2 bits (00 or 11) given redundant state of the visible appliance

P2P2: 2 bits (00 or 11) given redundant state of the audible appliance s: This bit gives state of the LED, or secondary indicator CCC: 3-bit coding Override, where 111 pattern means no override, other patterns same as Audible Coding Type, as described above.

As indicated, the 3-bit coding override is used to override the current audible settings for the notification appliances 24 with audible notification devices in this Group. In the preferred embodiment of the present invention, this override of coding type configuration is temporary in that it is only a force until the notification appliances in the Group receive an actuators OFF command, whereupon the notification appliances return to their configured, or default, coding type. A 3-bit spacer may be provided after the P/S state field. As shown, a parity bit 34 may follow all fields except the SYNC(p) signal 26 and SYNC(r) signal 28. A SYNC(r) signal 28 follows the 3-bit spacer.

Actuators on/off by Notification Appliance Command

The Actuators On/Off by Notification Appliance Command is used to address a notification appliance Group to modify the On/Off states of their notification devices and indicator. The format of this command including response is given below:

| | |
|---|---|
| Format | [SYNC(p)][POLL # (E1)][P][ADDR][P][P/S state][P]{3sp} [SYNC(r)] |
| Response | [ADDR][P] |

As shown, the Actuators On/Off by Notification Appliance Command begins with a SYNC(p) signal 26 followed by a command signal 30 ("E1") identifying this particular poll. The data field 32 includes an address of a particular notification appliance 24 and is followed by a P/S state field identical to that described above. A 3-bit spacer may be provided after the P/S state field. A SYNC(r) signal 28 follows the 3-bit spacer. The response includes a data field 32 indicating the address of the particular notification appliance 24. As shown, a parity bit 34 may follow all fields except the SYNC(p) signal 26 and SYNC(r) signal 28.

Notification Appliance Reset Command

The Notification Appliance Reset Command is a command to an addressed notification appliance 24 to turn all notification devices, indicators, and control elements OFF, purge all application specific Groups, and return the notification appliance to default configuration. The format of this command including response is given below:

| | |
|---|---|
| Format | [SYNC(p)][POLL#(FE)][P][ADDR][P]{3sp}[SYNC(r)] |
| Response | [ADDR][P] |

As shown, the Notification Appliance Reset Command begins with a SYNC(p) signal 26 followed by a command signal 30 ("FE") identifying this particular poll. The data field 32 includes an address of a particular notification appliance 24. A 3-bit spacer may be provided after the data field 32. A SYNC(r) signal 28 follows the 3-bit spacer. The response includes a data field 32 indicating the address of the particular notification appliance 24. As shown, a parity bit 34 may follow all fields except the SYNC(p) signal 26 and SYNC(r) signal 28.

Message Field Descriptions

Provided below is a summary of message field descriptions.

| | |
|---|---|
| [SYNC(p)] | 3-bit character consisting of a pulse to 24V of fixed width, followed by a 0 bit and a 1 bit. The sequence is sent by the system controller 14 to flag the beginning of a Poll. The sequence must begin with a data 0 to 24V transition. |
| [SYNC(r)] | 1-bit character consisting of a pulse to 24V of fixed width sent by the system controller 14 to flag the notification appliances to start responding. The rising edge of the pulse is used by devices to resynchronize their timing to that of the controller. |
| [3sp] | Filler bit interval that allows notification appliance 24 processing in preparation of Poll response. |
| [P] | Odd parity bit |
| [POLL#] | Binary encoded message identifier |
| [ADDR] | 8-bit binary encoded notification appliance. In the preferred embodiment, the addresses range from 01–63. |
| [Octet-Addr] | 8-bit field tells which group of 8 contiguous notification appliances is being addressed for summary polling. |
| [cr1;cr0] | Cluster Response Field, where 2-bit code flags summary status:<br>00 - no response received/Poll in error<br>01 - normal<br>10 - normal with notification device(s)<br>11 - need service/test mode |
| [Slot#/Grp#] | 8-bit group identifier where the first 2 bits designate which sub-group I.D. (1–3) follows, and the next 6 bits have that group number. |
| [Grp#] | 8-bit group identifier where the first 2 bits are hard coded 11 binary, and the next 6 bits have the group number. |
| [DevType] | 8-bit binary encoded notification appliance type I.D. code. |
| [Stat] | 8-bit status word. |
| [Config#] | 8-bit configuration words; meaning of the bits is dependent on notification appliance. |
| [Checksum#] | 8-bit algebraic checksum of the application specific group numbers currently assigned to this notification appliance. |
| [P/S State] | 8-bit command word for appliances and the LED, the format being [<u>P1P1</u> <u>P2P2</u> <u>s</u> <u>CCC</u>]<br>P1P1: 2 bits (00 or 11) given redundant state of the visible appliance<br>P2P2: 2 bits (00 or 11) given redundant state of the audible appliance |
| s: | This bit gives state of the LED, or secondary indicator |
| CCC: | 3-bit coding Override, where 111 pattern means no override, other patterns same as Audible Coding Type, as described above in the section entitled, "Notification Appliance Configuration Query Poll." |

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for communication in a fire alarm system, comprising:

sending a message to a notification appliance that alerts a person during a fire alarm condition, said message comprising a first synchronization signal, a command field, a data field, and a second synchronization signal; and at said notification appliance, responding as directed by said command field after said second synchronization signal.

2. A notification appliance for use in a fire alarm system, comprising:

at least one notification device that alerts a person during a fire alarm condition; and an electronic circuit that receives a message comprising a first synchronization signal, a command field, a data field, and a second synchronization signal and responds as directed by said command field after said second synchronization signal.

3. A fire alarm system, comprising:

a system controller for generating a plurality of multi-bit digital messages that control at least one notification appliance, the at least one notification appliance alerting a person during a fire alarm condition;

a pair of communication lines connecting said at least one notification appliance to said system controller; and said at least one notification appliance including an electronic circuit that receives a message comprising a first synchronization signal, a command field, a data field, and a second synchronization signal, and responds as directed by said command field after said second synchronization signal.

4. A method for communication in a fire alarm system, comprising:

providing a plurality of notification appliances in a standby mode of operation wherein said plurality of notification appliances are powered at a first voltage level, at least one of the plurality of notification appliances alerting a person during a fire alarm condition;

communicating with said plurality of notification appliances in said standby mode with data pulses relative to said first voltage level;

raising said first voltage level to a second voltage level in an active mode of operation; and communicating with said plurality of notification appliance in said active mode by reducing said second voltage level to about said first voltage level and communicating with data pulses relative to said first voltage level.

5. A fire alarm system, comprising:

a plurality of notification appliances powered at a first voltage level in a standby mode of operation; and a system controller that communicates with the notification appliances in the standby mode with data pulses relative to the first voltage level, the system controller raising the first voltage level to a second voltage level in an active mode of operation and communicating with the notification appliances in the active mode by reducing the second voltage level to about the first voltage level and communicating with data pulses relative to the first voltage level.

* * * * *